3,367,834
METHOD AND COMPOSITIONS FOR ENHANCING THE UTILIZATION OF IRON BY MAMMALS
Martin Dexter, 416 Cedar Drive, Briarcliff Manor, N.Y. 10510; Joseph V. Princiotto, 431 N. Monroe St., Arlington, Va. 22201; and Martin Rubin, 3218 Pauline Drive, Chevy Chase, Md. 20015
No Drawing. Continuation-in-part of application Ser. No. 185,836, Apr. 9, 1962. This application May 4, 1965, Ser. No. 453,192
4 Claims. (Cl. 167—68)

This application is a continuation-in-part of Ser. No. 185,836, filed Apr. 9, 1962, now abandoned.

The present invention relates to a method of enhancing the utilization of iron by mammals, and also to preparations therefor. In a more specific aspect, the invention is concerned with the prevention of anemia of the iron-deficiency type in mammals, more especially in suckling mammals. In particular, the invention is also concerned with increasing the iron content of the milk of lactating mammals whereby an iron-enriched milk is made available. The invention also relates to compositions suitable for administration, by way of injection or otherwise, to prevent or to relieve iron-deficiency in mammals.

It is known to use iron salts of chelating agents, such as ethylenediaminetetraacetic acid (EDTA), for prevention of iron-deficiency in suckling mammals. It is, however, a desideratum in the art to improve upon the results obtainable with the iron salts of EDTA, and this desideratum is surprisingly achieved by the present invention which involves the novel use of iron chelates derived from compounds of the formula

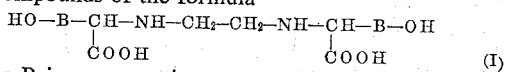
(I)

wherein B is an aromatic mono- or bicyclic hydrocarbon radical containing as substituents H, alkyl (especially lower alkyl), or halogen, e.g., F, Cl, Br and I; the OH group again being in each case in ortho-position to the —CH— bridge.

The iron chelates from compounds I, including the water soluble salts thereof, e.g., $Na+$, $K+$, $NH_4+$, etc., salts, are useful compounds for the hereinbefore-outlined purposes, particularly for preventing iron-deficiency in mammals, especially suckling mammals. Surprisingly, the ferrous and ferric chelates formed by the compounds I and/or by the water soluble salts of the compound I, are superior (in treating iron-deficiency) to the known iron salts of EDTA. It has been found that the iron chelates derived from compounds I are especially more effective than those of EDTA in treating the iron-deficiency of suckling mammals. The in vivo transport mechanism for compounds I is believed to differ from that of EDTA, accounting thereby for their greater effectiveness.

It is an object of this aspect of the present invention to prevent or treat iron-deficiency in mammals by administration of an iron chelate from these compounds I to said mammals, either perorally or by injection intravenously, intraperitoneally or intramuscularly. It is a particular object to treat or prevent iron-deficiency in suckling mammals by injection or peroral administration of an iron chelate from these compounds I to the lactating mother so that the milk consumed by the suckling mammal becomes enriched with available iron utilizable by the suckling mammal.

The iron chelates from these compounds I are preferably the ferric chelates derived from sodium or potassium salts of the said compounds. The iron chelate is advantageously administered in a suitable vehicle containing from about one percent to about twenty percent by weight of iron chelate formed from compounds I, and the dosage may vary from about one to about 200 milligrams per kilogram of body weight. Usually from about 5 to 10 mg./kg. is sufficient, however.

In vitro studies of iron uptake by reticulocyte cells of the rabbit show that the sodium iron chelates formed from these compounds I are surprisingly superior to iron chelates of EDTA in traversing the cell membrane. In vivo studies of urinary excretion following oral dosage demonstrate that iron chelates from these compounds I are better absorbed than are the iron chelates of EDTA. Likewise, when the iron chelates from compound I are administered by injection, e.g., subcutaneously, intraperitoneally, or intravenously, a similarly surprising improvement in utilization of iron by the living mammal is observed. Similarly, the iron content of milk from the lactating mother is greater than that obtained when using iron chelates of EDTA.

For example, when groups of lactating rats of average weight of about 200 grams, injected intramuscularly with 6 mg./kg. of iron (partly as labelled $Fe^{59}$) in form of monosodium ferric EDTA, are compared with other groups of lactating rats of about the same weight and similarly injected with 6 mg./kg. of iron (partly as labelled $Fe^{59}$) in the form of monosodium ferric salt of ethylene-bis-($\alpha$-imino-o-hydroxyphenyl acetic acid), then again surprisingly more iron is found in the blood of the suckling young rats in the case of those feeding from mothers injected with the monosodium ferric chelate of ethylene-bis-($\alpha$-imino-o-hydroxyphenyl acetic acid).

For example, an aqueous solution of the disodium salt of ethylene-bis-($\alpha$-imino-2-hydroxy-5-methylphenyl acetic acid) is prepared by dissolving the free acid in 0.1 N aqueous sodium hydroxide solution. The ferric chelate is prepared by adding to the foregoing solution of disodium ethylene-bis-($\alpha$-imino-2-hydroxy - 5 - methyl-phenylacetate), a stoichiometric amount of 0.1 N ferric chloride aqueous solution and adjustment of pH to 7.0–7.5 by addition of 0.1 N sodium carbonate (aqueous) solution thereto.

The aqueous solution of the ferric chelate derived from ethylene-bis-($\alpha$-imino-2-hydroxy - 5 - methylphenyl acetic acid) is administered by injection to pregnant rats within a few days of termination of pregnancy in a daily dosage of about 6 mg./kg. After a normal litter is obtained and lactation has commenced, the amount of iron absorbed by the suckling rats is determined by comparison with the known quantity of labelled iron in the original ferric chloride solution which is used to make up the solution of ferric chelate derived from sodium ethylene-bis-($\alpha$-imino-2-hydroxy-5-methylphenyl acetic acid). The labelled iron administered as the chelate to the mother at before birth is found subsequently in the young, thus confirming absorption of iron by the mother in a form useful to the young rat.

Similarly improved absorption and excretion of iron is also realized when a sodium ferric chelate of any of the following is employed:

ethylene-bis-($\alpha$-imino-o-hydroxynaphthyl acetic acid)
ethylene-bis-($\alpha$-imino-2-hydroxy-3-chlorophenyl acetic acid)
ethylene-bis-($\alpha$-imino-2-hydroxy-5-chlorophenyl acetic acid)
ethylene-bis-($\alpha$-imino-2-hydroxy-3,5-dibromophenyl acetic acid)
ethylene-bis-($\alpha$-imino-2-hydroxy-3,5-dichlorophenyl acetic acid)
ethylene-bis-($\alpha$-imino-2-hydroxy-5-methylphenyl acetic acid)
ethylene-bis-($\alpha$-imino-2-hydroxy-3,5-dimethylphenyl acetic acid)
ethylene-bis-($\alpha$-imino-2-hydroxy-5-tertiarybutylphenyl acetic acid)
ethylene-bis-($\alpha$-imino-2-hydroxy-5-octylphenyl acetic acid)
ethylene-bis-($\alpha$-imino-o-hydroxyphenyl acetic acid)

When similar administration of iron salts of EDTA is compared with iron chelates from the compounds I illustrated above, except that other mammals, e.g., beagle bitches, having suckling pups are injected, a similarly marked improvement in iron content of the lactating mammal's (dog's) milk is obtained with iron chelates from compounds I.

The chelating agents I and the iron chelates derived therefrom may all be prepared analogously to the hereinbefore described manner for ethylene-bis-(α-imino-2-hydroxy-5-methylphenyl acetic acid).

It will be clear from the foregoing that in addition to making available the objective methods of administering therapeutic iron to mammals, and more especially to mammals suffering from iron-deficiency anemia, and of increasing the iron content of the milk of lactating mammals, the invention also makes available novel iron-containing compositions, primarily in the form of mallian milk containing iron chelates derived from compounds I. While in the simplest aspect of the invention this novel composition is fed as the iron-enriched milk from the treated lactating mother to the latter's suckling offspring, it is possible to collect the said iron-enriched milk, e.g., by means of a breast pump, and to transport it elsewhere for feeding mechanically, e.g., by the conventional bottle-and-nipple route, to suckling or other mammals.

It is also possible to incorporate any of the active chelates derived from any one of the compounds into a suitable liquid vehicle, e.g., conventional pasteurized cow's milk, thereby providing a composition for simultaneously feeding, for instance an infant mammal, and making available therapeutically useful iron thereto. By way of illustration, such a composition may consist essentially of a solution of any one of the herein disclosed compounds, for instance sodium ferric chelate of ethylene-bis-(α-imino-2-hydroxy-5-methylphenyl acetic acid), in cow's milk, such solution containing from about one to about twenty percent by weight of said chelate. In feeding the said composition, the amount fed is correlated in such manner that a daily dose of about one to about twenty milligrams of chelate per kilogram of body weight is administered. The liquid vehicle may be suitably varied; for example, the milk may be replaced by orange juice or the like.

Any of the compositions prepared according to the preceding paragraph, and more especially those wherein the liquid vehicle is milk, can be converted into a dry and storage-stable preparation reconstitutable into the liquid composition form by the addition of water, the conversion into dry preparation form being effected in per se conventional manner, advantageously by spray drying.

In administering the new chelates of the present invention by injection, the vehicle may, as aforesaid, be water. However, any other suitable and conventional liquid vehicle employed in injection solutions, e.g., peanut oil, sesame oil, PVP, or the like, may also be employed.

What is claimed is:

1. A method of supplying physiologically useful iron to a lactating mammal which comprises administering to said mammal iron chelate from a compound of the formula:

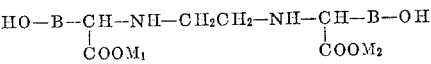

wherein B is a member selected from the group consisting of monocyclic and bicyclic aromatic radicals having the OH group ortho to the methylene group attached to N and containing at least one substituent selected from the group consisting of H, lower alkyl and halogen, and each of $M_1$ and $M_2$ is a member selected from the group consisting of H, alkali metal and ammonium.

2. A method of supplying physiologically useful iron to an iron-deficient lactating mammal which comprises administering to said mammal a therapeutically acceptable solution of iron chelate from a compound of the formula:

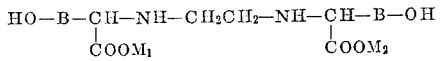

wherein B is a member selected from the group consisting of monocyclic and bicyclic aromatic radicals having the OH group ortho to the methylene group attached to N and containing at least one substituent selected from the group consisting of H, lower alkyl and halogen, and each of $M_1$ and $M_2$ is a member selected from the group consisting of H, alkali metal and ammonium.

3. A method according to claim 1 wherein the therapeutically effective iron chelate is of ethylene-bis-(α-imino-2-hydroxy-5-methylphenyl acetic acid).

4. A method according to claim 1 wherein the therapeutically effective iron chelate is of ethylene-bis-(α-imino-2-hydroxy-5-chlorophenyl acetic acid).

References Cited

UNITED STATES PATENTS

| | | | |
|---|---|---|---|
| 2,624,757 | 1/1953 | Bersworth | 167—65 |
| 2,624,760 | 1/1953 | Bersworth | 260—429 |
| 2,816,060 | 12/1957 | Carter | 167—78 |
| 2,893,916 | 7/1959 | Rubin | 167—78 |
| 2,955,981 | 10/1960 | Linkenheimer | 167—53 |
| 3,051,563 | 8/1962 | Bersworth | 260—429 |
| 3,095,297 | 6/1963 | Rembe | 260—429 |

FOREIGN PATENTS

| | | |
|---|---|---|
| 13,006 | 3/1912 | Great Britain. |
| 97,320 | 3/1961 | Netherlands. |

OTHER REFERENCES

Current List of Medical Literature, vol. 33, entry 13517, 1958 (citing Fabiano, Annal. di Ostetricia e Ginecologia, vol. 78, No. 10, pp. 1043–1060, 1956.

LEWIS GOTTS, *Primary Examiner.*

ELBERT L. ROBERTS, *Examiner.*

R. L. HUFF, *Assistant Examiner.*